US008838625B2

(12) United States Patent
Xu et al.

(10) Patent No.: US 8,838,625 B2
(45) Date of Patent: Sep. 16, 2014

(54) AUTOMATED SCREEN SCRAPING VIA GRAMMAR INDUCTION

(75) Inventors: Zhichen Xu, San Jose, CA (US); Yun Fu, Sunnyvale, CA (US); Peter Yen, Sunnyvale, CA (US); Ning Song, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 995 days.

(21) Appl. No.: 12/417,773

(22) Filed: Apr. 3, 2009

(65) Prior Publication Data

US 2010/0256974 A1 Oct. 7, 2010

(51) Int. Cl.
*G06F 17/30* (2006.01)
*G06F 17/24* (2006.01)
*G06F 17/27* (2006.01)

(52) U.S. Cl.
CPC .......... *G06F 17/248* (2013.01); *G06F 17/2715* (2013.01)
USPC .......................................... 707/755; 707/741

(58) Field of Classification Search
USPC .................................. 707/741, 755
See application file for complete search history.

(56) References Cited

U.S. PATENT DOCUMENTS

| 2006/0287989 A1* | 12/2006 | Glance .............................. 707/3 |
| 2007/0143660 A1* | 6/2007 | Huey et al. ..................... 715/500 |
| 2008/0114751 A1* | 5/2008 | Cramer et al. .................... 707/5 |
| 2008/0320039 A1* | 12/2008 | Ohwa ....................... 707/103 R |
| 2009/0150806 A1* | 6/2009 | Evje et al. ...................... 715/762 |
| 2010/0017366 A1* | 1/2010 | Robertson et al. ................ 707/3 |
| 2010/0070448 A1* | 3/2010 | Omoigui ......................... 706/47 |
| 2010/0256974 A1* | 10/2010 | Xu et al. ........................... 704/9 |
| 2011/0202850 A1* | 8/2011 | Chan et al. ..................... 715/745 |

* cited by examiner

*Primary Examiner* — Ajay Bhatia
*Assistant Examiner* — Kurt Mueller
(74) *Attorney, Agent, or Firm* — Hickman Palermo Truong Becker Bingham Wong LLP (57) ABSTRACT

A method and a computer-readable medium are provided which perform screen scraping via grammar induction. The computer-readable medium stores instructions of the method, the instructions directing a computer processor to intercept display information transmitted to a computer-implemented display device representing information stored in a data source; induce a grammar via statistical analysis of the intercepted display information; provide the grammar to a parser-generator to generate a parser corresponding to the induced grammar; and perform screen scraping using the generated parser.

16 Claims, 6 Drawing Sheets

FIG. 6

AUTOMATED SCREEN SCRAPING VIA GRAMMAR INDUCTION

BACKGROUND OF INVENTION

1. Field of Invention

Aspects of embodiments relate to information processing. More particularly, aspects of embodiments relate to determining information content displayed by users of information processing systems including diverse sources of information and diverse display systems and methods.

2. Discussion of Related Art

Users of large networks, such as the Internet, interact with large numbers of diverse programs for generating, storing, communicating and otherwise manipulating user generated content. For example, a user of a social networking Internet site or component of a site may store contact information for their contacts in records on the site that include fields like name, address, and multiple phone numbers. A user of a photo/video Internet site or component of a site may store photo or video records that include the image data, tags, descriptions and comments. These user-generated contents are of diverse types and varying formats. Moreover, the structures and mark-up of the content can change frequently. For various purposes, including further manipulation of the information or data collection regarding the information, determining the structure and content of the information may be desired.

To manually induce the structure is not only tedious, but also very error-prone. Given the large number of data sources and the extreme diversity of structure used by them, a lot of computer and/or human time is required to analyze the data sources individually.

Normally, data transfer between programs is accomplished using data structures suited for automated processing by computers, not people. Such interchange formats and protocols are typically rigidly structured, well-documented, easily parsed, and keep ambiguity to a minimum. Very often, these transmissions are not human-readable at all.

In contrast, output intended to be human-readable is often the antithesis of this, with display formatting, redundant labels, superfluous commentary, hidden and embedded metadata and other information which is either irrelevant or inimical to automated processing. However, if the person, entity or computer program seeking to analyze data being transferred from one program to another or from an Internet site to a user can only intercept such human-oriented display data, screen scraping may be employed. In order to perform screen scraping, the structure of the display information must be known so that the content can be successfully parsed.

SUMMARY OF INVENTION

Aspects of embodiments are advantageous because they automate a very tedious process, and significantly reduce human error. Moreover, aspects of embodiments can monitor data sources to automatically detect structural and syntactic changes at the data sources; and, dynamically update processes which extract useful information from the data sources.

According to an embodiment, display information transmitted to a computer-implemented display device representing information stored in a data source is intercepted; a grammar is induced via statistical analysis of the display information; the grammar is provided to a parser-generator to generate a parser corresponding to the induced grammar; and, the generated parser performs screen scraping using the generated parser.

According to another embodiment, a computer-readable medium is provided. The computer-readable medium stores instructions directing a computer processor to intercept display information transmitted to a computer-implemented display device representing information stored in a data source; induce a grammar via statistical analysis of the intercepted display information; provide the grammar to a parser-generator to generate a parser corresponding to the induced grammar; and perform screen scraping using the generated parser.

According to aspects of embodiments, a computer-implemented method of extracting information from a data source includes: intercepting display information transmitted to a computer-implemented display device representing information stored in a data source; inducing a grammar via statistical analysis of the intercepted display information; generating a parser corresponding to the induced grammar; and performing screen scraping using the generated parser to produce a sequence of return values representing the extracted information.

According to variations on these aspects of embodiments, inducing a grammar further comprises: tokenizing the text; counting occurrences of each token; forming a histogram of tokens according to the frequency of each token; and segmenting the text into records starting with tokens with lower frequency. According to another variation, inducing a grammar further comprises: recursively segmenting the records to identify the underlying hierarchical structure. In another variation, generating the parser further comprises: receiving the induced grammar; representing the induced grammar using a regular language; and programming state transitions of a finite state machine to correspond to relationships represented in the regular language. In another variation, generating the parser further comprises: receiving additional annotations which specify fields to extract and how the fields map to the return values. According to yet another variation, screen scraping further comprises: receiving the intercepted display information as an input to the finite state machine; and producing the return values representing the extracted information.

According to other aspects of embodiments, there is provided a computer-readable medium in which are stored instructions directing a computer processor to: intercept display information transmitted to a computer-implemented display device representing information stored in a data source; induce a grammar via statistical analysis of the intercepted display information; provide the grammar to a parser-generator to generate a parser corresponding to the induced grammar; and perform screen scraping using the generated parser.

According to variations on these aspects of embodiments, inducing a grammar further comprises: tokenizing the text; counting occurrences of each token; forming a histogram of tokens according to the frequency of each token; and segmenting the text into records starting with tokens with lower frequency. According to another variation, inducing a grammar further comprises: recursively segmenting the records to identify the underlying hierarchical structure. In another variation, generating the parser further comprises: receiving the induced grammar; representing the induced grammar using a regular language; and programming state transitions of a finite state machine to correspond to relationships represented in the regular language. In another variation, generating the parser further comprises: receiving additional annotations which specify fields to extract and how the fields map to the return values. According to yet another variation, screen scraping further comprises: receiving the intercepted display information as an input to the finite state machine; and producing the return values representing the extracted information.

According to yet other aspects of embodiments, apparatus for extracting information from a computer-based data source comprises: means for intercepting display information transmitted to a computer-implemented display device representing information stored in a data source; and a computer processor executing a sequence of instructions configuring the computer processor as: a grammar inducer producing a representation of a hierarchy as segmented records defined using a regular language; a parser-generator receiving the segmented records defined using the regular language and configured to generate a parser corresponding thereto; and a screen scraper configured to extract the information from the intercepted display information using the generated parser.

According to variations on these aspects of embodiments, the sequence of instructions for the grammar inducer further comprises configuring the processor to perform: tokenizing the text; counting occurrences of each token; forming a histogram of tokens according to the frequency of each token; and segmenting the text into records starting with tokens with lower frequency. According to another variation, the sequence of instructions for the grammar inducer further comprises configuring the processor to perform: recursively segmenting the records to identify the underlying hierarchical structure. According to yet another variation, the sequence of instructions for the parser-generator further comprises configuring the processor to perform: receiving the induced grammar; representing the induced grammar using a regular language; and programming state transitions of a finite state machine to correspond to relationships represented in the regular language. According to a further variation, the sequence of instructions for the parser-generator further comprises configuring the processor to perform: receiving additional annotations which specify fields to extract and how the fields map to the return values. According to yet a further variation, the sequence of instructions for the screen scraper further comprises configuring the processor to perform: receiving the intercepted display information as an input to the finite state machine; and producing the return values representing the extracted information.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Obtaining foreknowledge of the structure of display information has been a problem, in view of the constant evolution of programs and Internet sites to handle varying types of user generated content. Indeed, operators of some Internet sites may deliberately alter the layout and other presentation details of their sites specifically to, among other things, avoid the extraction of data from the information in human readable form.

Computer System

Various aspects and functions described herein in accord with the present invention may be implemented as hardware or software on one or more computer systems. There are many examples of computer systems currently in use. Some examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Additionally, aspects in accord with the present invention may be located on a single computer system or may be distributed among a plurality of computer systems connected to one or more communication networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system elements and components using a variety of hardware and software configurations, and the invention is not limited to any particular distributed architecture, network, or communication protocol.

Figure 1:
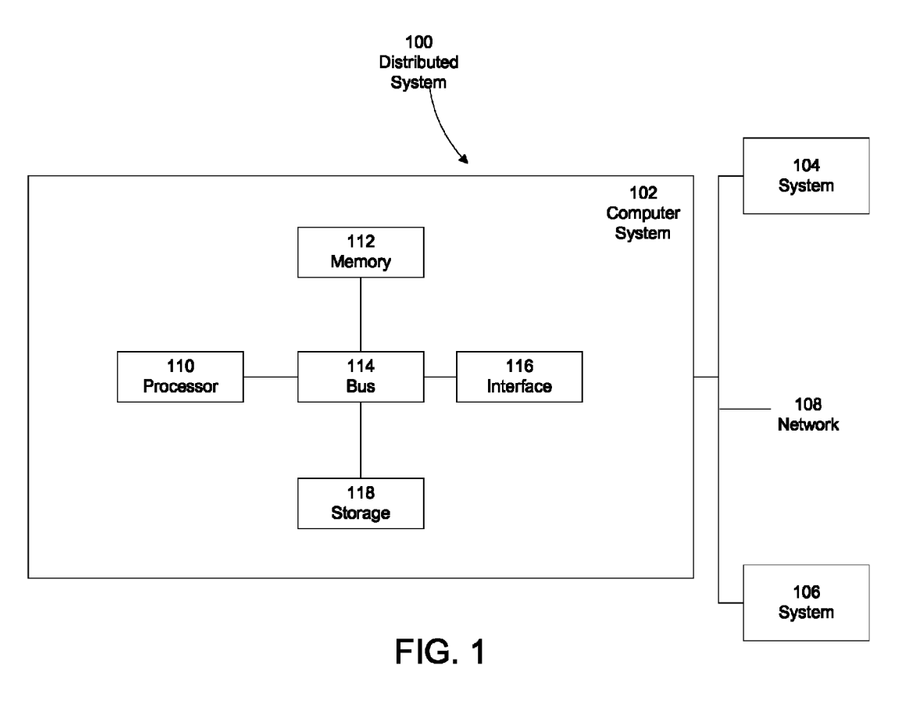
FIG. 1 illustrates an example computer system upon which various aspects in accord with the present invention may be implemented.

FIG. 1 shows a block diagram of a distributed computer system 100, in which various aspects and functions in accord with the present invention may be practiced. The distributed computer system 100 may include one more computer systems. For example, as illustrated, the distributed computer system 100 includes three computer systems 102, 104 and 106. As shown, the computer systems 102, 104 and 106 are interconnected by, and may exchange data through, a communication network 108. The network 108 may include any communication network through which computer systems may exchange data. To exchange data via the network 108, the computer systems 102, 104 and 106 and the network 108 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA IIOP, RMI, DCOM and Web Services. To ensure data transfer is secure, the computer systems 102, 104 and 106 may transmit data via the network 108 using a variety of security measures including TSL, SSL or VPN, among other security techniques. While the distributed computer system 100 illustrates three networked computer systems, the distributed computer system 100 may include any number of computer systems, networked using any medium and communication protocol.

Various aspects and functions in accord with the present invention may be implemented as specialized hardware or software executing in one or more computer systems including a computer system 102 shown in FIG. 1. As depicted, the computer system 102 includes a processor 110, a memory 112, a bus 114, an interface 116 and a storage system 118. The processor 110, which may include one or more microprocessors or other types of controllers, can perform a series of instructions that result in manipulated data. The processor 110 may be a commercially available processor such as an Intel Pentium, Motorola PowerPC, SGI MIPS, Sun UltraSPARC, or Hewlett-Packard PA-RISC processor, but may be any type of processor or controller as many other processors and controllers are available. As shown, the processor 110 is connected to other system elements, including a memory 112, by the bus 114.

The memory 112 may be used for storing programs and data during operation of the computer system 102. Thus, the memory 112 may be a relatively high performance, volatile, random access memory such as a dynamic random access memory (DRAM) or static memory (SRAM). However, the memory 112 may include any device for storing data, such as a disk drive or other non-volatile storage device. Various embodiments in accord with the present invention can organize the memory 112 into particularized and, in some cases, unique structures to perform the aspects and functions disclosed herein.

Components of the computer system 102 may be coupled by an interconnection element such as the bus 114. The bus 114 may include one or more physical busses (for example, busses between components that are integrated within a same machine), but may include any communication coupling between system elements including specialized or standard computing bus technologies such as IDE, SCSI, PCI and InfiniBand. Thus, the bus 114 enables communications (for example, data and instructions) to be exchanged between system components of the computer system 102.

The computer system 102 also includes one or more interface devices 116 such as input devices, output devices and combination input/output devices. The interface devices 116 may receive input or provide output. More particularly, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 116 allow the computer system 102 to exchange information and communicate with external entities, such as users and other systems.

The storage system 118 may include a computer readable and writeable nonvolatile storage medium in which instructions are stored that define a program to be executed by the processor. The storage system 118 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk or flash memory, among others. In operation, the processor 110 or some other controller may cause data to be read from the nonvolatile recording medium into another memory, such as the memory 112, that allows for faster access to the information by the processor than does the storage medium included in the storage system 118. The memory may be located in the storage system 118 or in the memory 112. The processor 110 may manipulate the data within the memory 112, and then copy the data to the medium associated with the storage system 118 after processing is completed. A variety of components may manage data movement between the medium and integrated circuit memory element and the invention is not limited thereto. Further, the invention is not limited to a particular memory system or storage system.

Although the computer system 102 is shown by way of example as one type of computer system upon which various aspects and functions in accord with the present invention may be practiced, aspects of the invention are not limited to being implemented on the computer system as shown in FIG. 1. Various aspects and functions in accord with the present invention may be practiced on one or more computers having a different architectures or components than that shown in FIG. 1. For instance, the computer system 102 may include specially-programmed, special-purpose hardware, such as for example, an application-specific integrated circuit (ASIC) tailored to perform a particular operation disclosed herein. While another embodiment may perform the same function using several general-purpose computing devices running MAC OS System X with Motorola PowerPC processors and several specialized computing devices running proprietary hardware and operating systems.

The computer system 102 may include an operating system that manages at least a portion of the hardware elements included in computer system 102. A processor or controller, such as processor 110, may execute an operating system which may be, among others, a Windows-based operating system (for example, Windows NT, Windows 2000 (Windows ME), Windows XP, or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system.

The processor and operating system together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, aspects in accord with the present invention may be implemented using an object-oriented programming language, such as SmallTalk, JAVA, C++, Ada, or C# (C-Sharp). Other object-oriented programming languages may also be used. Alternatively, procedural, scripting, or logical programming languages may be used.

Additionally, various aspects and functions in accord with the present invention may be implemented in a non-programmed environment (for example, documents created in HTML, XML or other format that, when viewed in a window of a browser program, render aspects of a graphical-user interface or perform other functions). Further, various embodiments in accord with the present invention may be implemented as programmed or non-programmed elements, or any combination thereof. For example, a web page may be implemented using HTML while a data object called from within the web page may be written in C++. Thus, the invention is not limited to a specific programming language and any suitable programming language could also be used.

A computer system included within an embodiment may perform functions outside the scope of the invention. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from Sun Microsystems of Santa Clara, Calif. or integration software such as WebSphere middleware from IBM of Armonk, N.Y. However, a computer system running, for example, SQL Server may be able to support both aspects in accord with the present invention and databases for sundry applications not within the scope of the invention.

Example System Architecture

Figure 2:
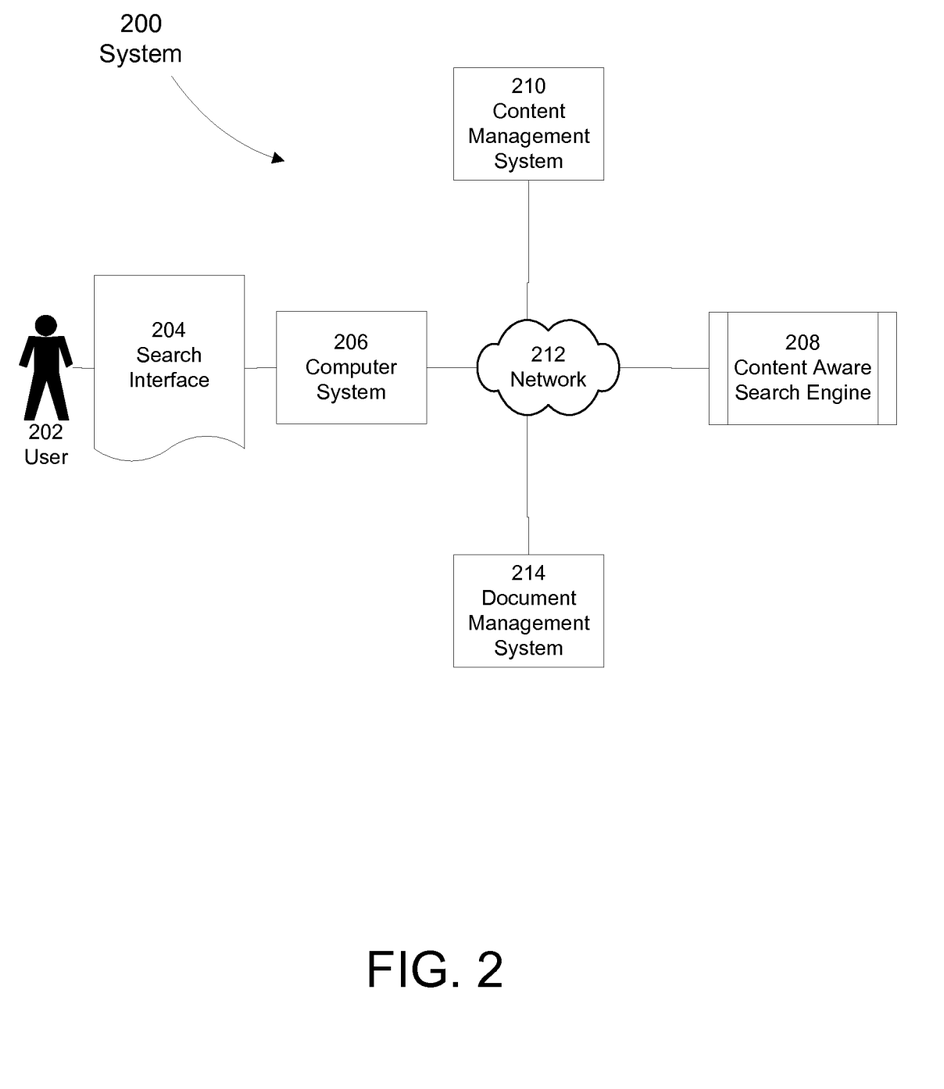
FIG. 2 depicts an example search engine in the context of a distributed system according to an embodiment.

FIG. 2 presents a context diagram of a distributed system 200 specially configured to include an embodiment in accordance with various aspects of the present invention. Referring to FIG. 2, the system 200 includes a user 202, an access interface, such as a search interface 204, a computer system 206, a content delivery engine, such as a search engine 208, a content management system, such as a social networking system 210, and a communications network 212. In the embodiment shown, the access interface 204 is a browser-based user interface served by the content delivery engine 208 and rendered by the computer system 206. In this illustration, the computer system 206, the content delivery engine 208, and the content management system 210 are interconnected via the network 212. The network 212 may include any communication network through which member computer systems may exchange data. For example, the network 212 may be a public network, such as the Internet, and may include other public or private networks such as LANs, WANs, extranets and intranets.

The sundry computer systems shown in FIG. 2, which include the computer system 206, the content delivery engine 208, the content management system 210, and the network 212 each may include one or more computer systems. As discussed above with regard to FIG. 1, computer systems may have one or more processors or controllers, memory and interface devices. The particular configuration of system 200 depicted in FIG. 2 is used for illustration purposes only and embodiments of the invention may be practiced in other contexts. Thus, the invention is not limited to a specific number of users or systems.

In various embodiments, the content delivery engine 208 includes facilities configured to provide requested content to users. In the illustrated embodiment, the content delivery engine 208 can provide the access interface 204 to the user 202. The access interface 204 may include facilities configured to allow the user 202 to search, select and review a variety of content, including content created by other users and made available through a social networking site. For example, in one embodiment, the access interface 204 can provide, within a set of search results, navigable links to documents or other content available from one or more of a wide variety of websites connected to the network 212. In other embodiments, the access interface 204 can provide links to documents stored in the content delivery engine 208.

Aspects of embodiments first send out a request for information from the content delivery engine 208, for example in the form of a message using one of the conventional http, https, pop, etc. protocols. The exemplary protocols http and https are hypertext transfer protocols (unsecure and secure, respectively) used on computer networks to transfer hypertext documents, for example between content servers and client applications (e.g. content consumers such as browser applications). The pop protocol is a post office protocol used on computer networks to transfer electronic mail information between email systems, such as email servers and email clients (e.g. Outlook or Outlook Express). Other protocols having other applications can also be used. In response to the request, a response from the service, e.g., mail, address book, or social network site, etc. is returned, also using one of the http, https, pop, etc. protocols. That response is processed according to the methods next described.

Figure 3:
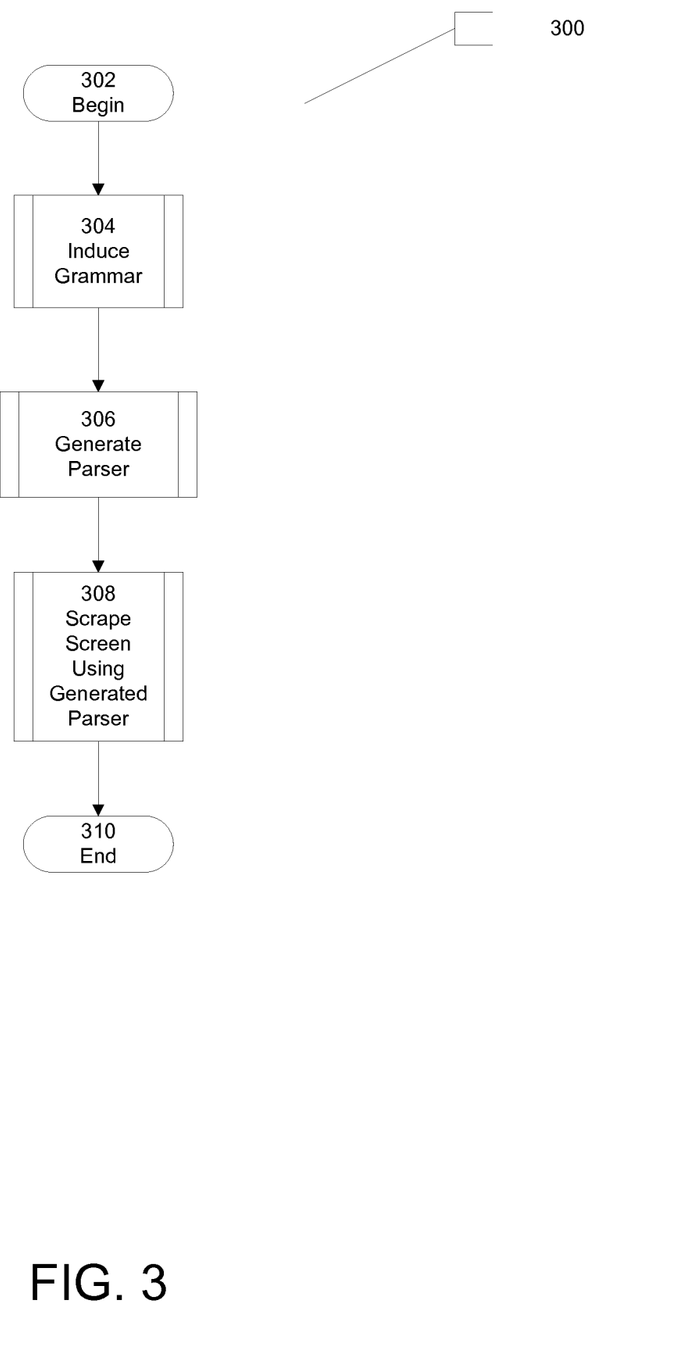
FIG. 3 illustrates a process for performing grammar induction.

Without loss of generality, some computer-implemented aspects of embodiments, such as shown in FIG. 3, include a process 300 having three elements. The process begins 302. First, a grammar is induced 304, via statistical analysis of text requested from a service using one of the protocols referred to above and transmitted to a display, for example as a formatted HTML page returned to a browser window using one of the protocols referred to above. Second, the grammar is fed into a parser-generator to generate a parser, 306. Third, the generated parser performs screen scraping, 308. The process 300 then concludes, 310. The elements of this method are described now in greater detail.

The grammar of a message defines how to break up a message into its component parts. One representation of breaking up a message into its component parts is as a data structure. The parts may include content data, formatting data, and other data elements. Parsing identifies those parts of a message that are of interest, and what they signify. The actual meaning extracted from a part of the message identified as "of interest" is contained in the information or value conveyed by that part, as that information or value relates to the significance of the part. As an example, suppose a received message is an address book entry, including (among other things) message components representing information signifying First Name, Last Name, Email and Phone for a person. Grammar induction identifies the four components (as well as any others); the parser generator identifies by their significance the components desired to be extracted (e.g. First Name, Last Name and Phone, but not Email, if such is the subset desired) and creates a parser to do so; and the parser so generated then operates on received messages of this type to extract First Name, Last Name and Phone information in response to suitable queries.

Grammar induction and parser generation is most easily employed when a known input and a corresponding known output are available. The processes described below can proceed iteratively, with corrections between iterations, until the known input produces the correct known output. Iterations can be performed automatically using known artificial intelligence principles, or can be performed with the assistance of a human user who recognizes correct and incorrect results and instructs the system accordingly. The result of these two processes is an identification of the organization of meaning within a message (i.e., the grammar) and identification within the organization of meaning of those elements of meaning that are of interest in a particular application, along with the means to extract that meaning (i.e., the generated parser).

Grammar Induction

Figure 4:
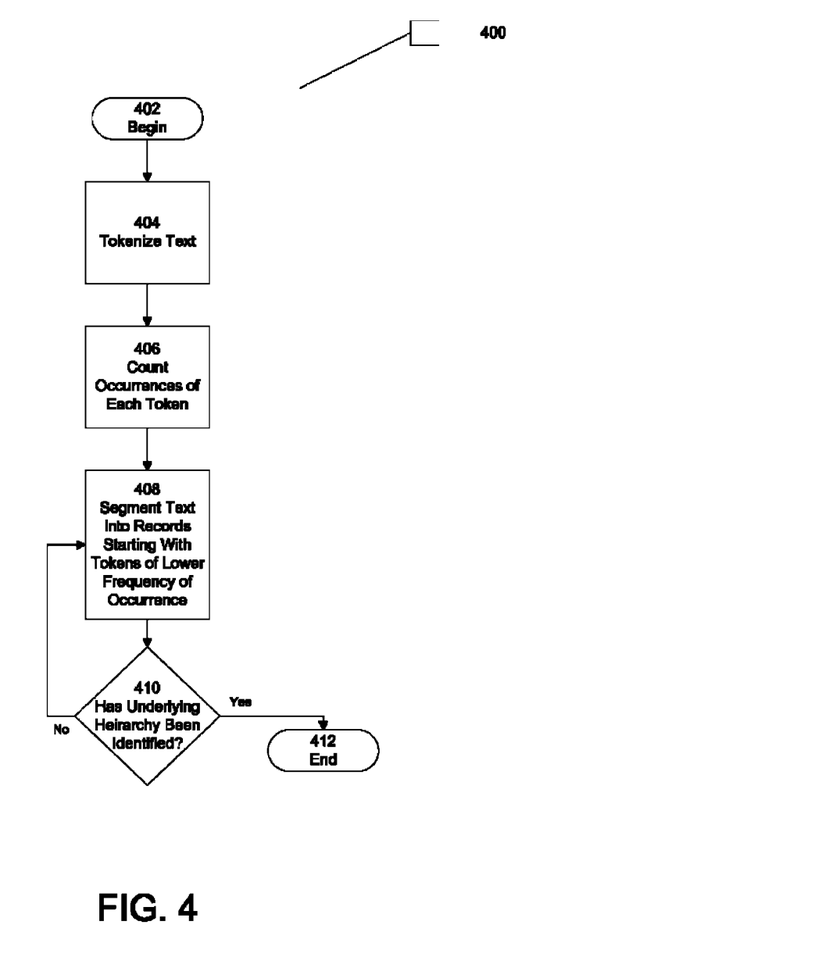
FIG. 4 illustrates a process for performing parser generation.

To automatically induce grammar, a statistical method is employed. As shown in FIG. 4, one way to induce the grammar of a text 400 is as follows. When a screen of text is received, the process begins 402.

1) First tokenize the text, and assign a position to each token, where a token is one or more characters taken as a unit, 404.
2) Next, count the occurrences of each token and form a histogram of tokens according to the frequency of each token, 406. Each bucket of the histogram corresponds to a token. Assume that the data has a tree-like structure; top level items tend to have lower frequency than lower level tokens.
3) Starting with tokens with lower frequency, i.e. the top of the hierarchy, the text is segmented into records, 408.
4) The identified records are then segmented recursively to identify the underlying hierarchical structure, 410.

The process ends 412 when the underlying hierarchy has been fully identified through the recursive segmentation 410.

Other statistical methods can alternatively be employed to identify the hierarchical structure underlying displayed information. In the aspects of embodiments illustrated herein the hierarchical structure is identified through its description by a regular language, however that structure is ultimately derived and identified. In computer science, a regular language is a formal language that can be accepted by a deterministic or non-deterministic finite state machine, and which therefore can be interpreted by such a machine.

Text is represented in computer systems such as described above by strings of characters encoded for processing by the computer system. As in written human language, in which the text will ultimately be displayed, elements of text are composed of such strings of characters, separated from each other by special characters which may be variously known as "whitespace," "punctuation," "control" or other separating characters known in this art. Tokenizing the text involves first identifying, using the separating characters as boundaries, individual elements of the text, for example words or numbers. Using the frequency analysis described above, the hierarchical structure of the text can be identified, permitting the tokens to be placed into a framework of segmented records, groups of records (e.g., tables or arrays), super-groups of records (e.g., pages, workbooks or schema), etc. The text is segmented recursively to determine the hierarchy. It is the relationship between the hierarchical structure (i.e., the segmented records and their relationships) and the text within that structure which gives the text as a whole meaning to the human viewing the text on a display or printed page, and which admits of representation by a regular language. Thus, once these elements are determined, a finite-state machine or other mechanism can be set up to similarly extract meaning from the text and hierarchy.

Parser Generation

Given that the structure and hierarchy of a human-readable screen full of text is represented as described above by a regular language, the parser can be based on a finite state machine, i.e., a finite automaton. Although the present example employs such a finite state machine, other programming constructs can be used to represent the structure of the user generated contents, if desired.

Figure 5:
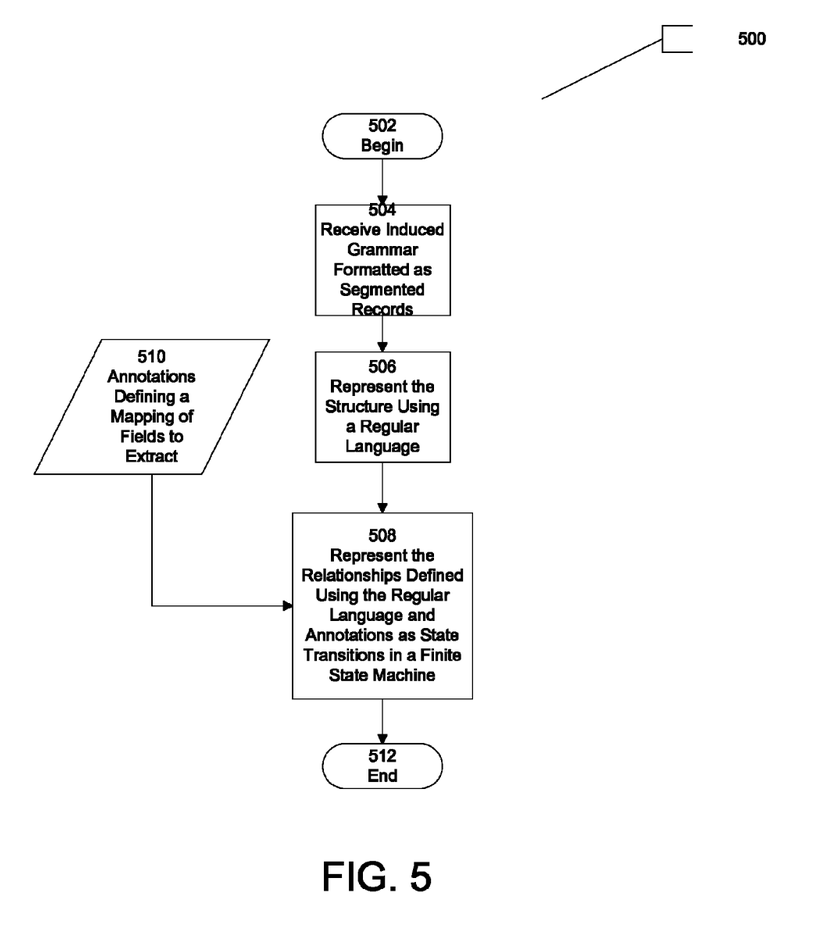
FIG. 5 illustrates a process for performing screen scraping using the parser generated according to the process of FIG. 4.

The parser generator process 500, which begins at 502, is shown in FIG. 5.

The parser generator receives the induced grammar as represented by the segmented records, 504, represents that segmented record structure as a regular language, 506, and programs state transitions of a finite state machine to represent the relationships defined by that regular language, 508. In addition to the induced grammar, the parser-generator also receives as input additional annotations, 510. These annotations specify which fields to extract and how these fields map to the return values of the screen scrapper. The additional annotations can be provided by a user employing their a priori knowledge of the information expected from a particular source, or can be derived automatically from information contained in the text or its structure, such as labels indicating the presence of one or another type of field.

The programming of the finite state machine can proceed deterministically, without further manual intervention if enough initial information is provided to define the desired output, so the programming facility can recognize the correct result. The initially-provided information can also enable the programming facility to define formatting or transformation options, such as when a field designated "Surname" should map to a field designated "Last Name" and when it should instead map to a field designated "First Name" in a particular application.

Once the finite state machine is programmed the process concludes, 512.

It should be noted that the description of a human-readable screen full of text, or any other message type to be parsed, by a regular language is not a requirement. In practice, less structured or semi-structured data can be parsed using methods according the aspects of embodiments. For example, in response to some queries, some applications may return items with varying grammar, such as when some items in a catalog have descriptions while others do not, or such as when some items in a catalog have a price while others do not, or even such as when some items have a price range rather than a single value for price. Grammar can be induced from regular language (which is context-free) or from irregular language (which is context-sensitive); and, a suitable parser generated from either, simply by producing a state machine having extra states to recognize the context.

Screen Scraping Via Auto-Generated Parser

Figure 6:
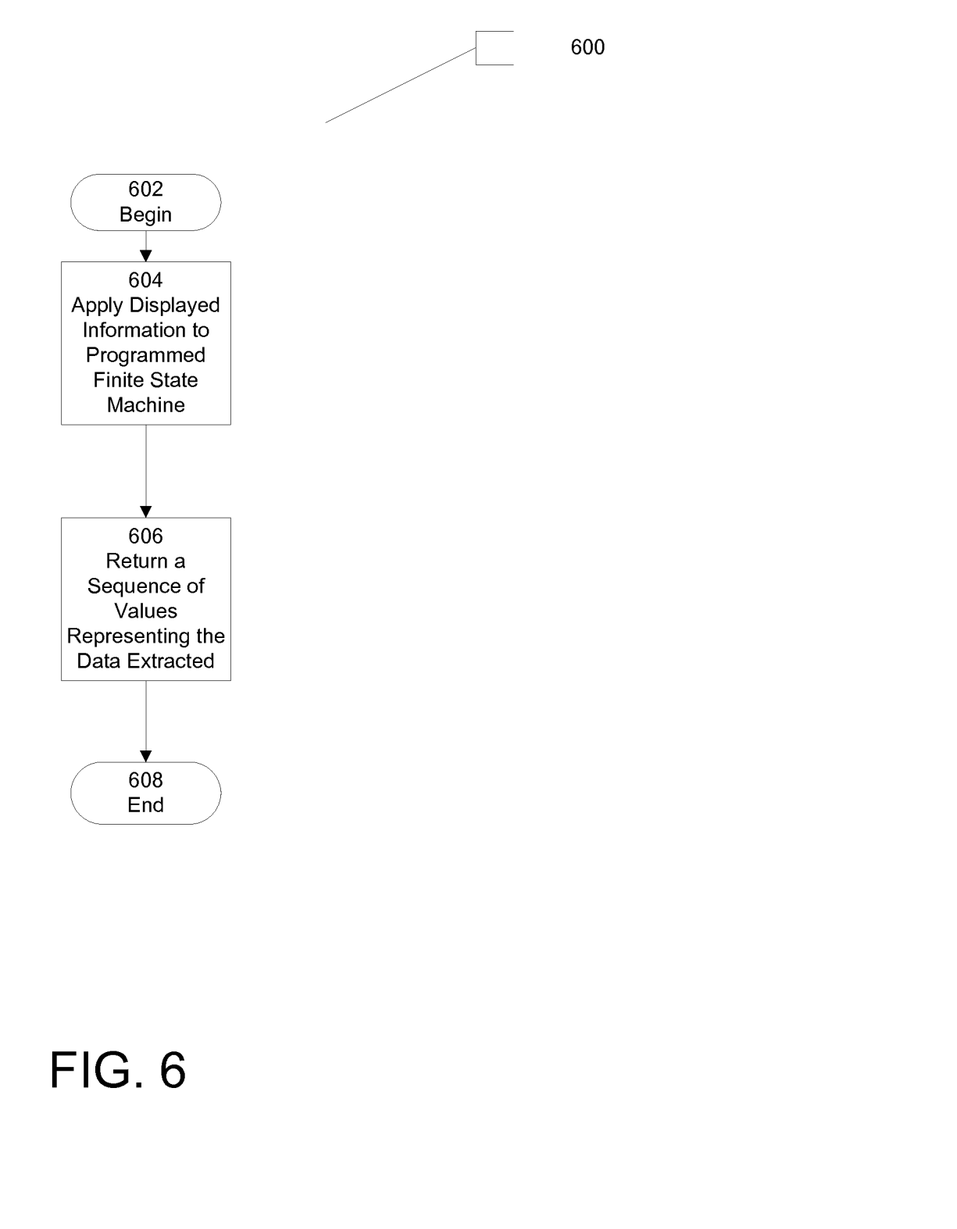
FIG. 6 illustrates an overall screen scraping process according to aspect of an embodiment.

Given the state-machine based parser generated by the parser-generator, as shown in FIG. 6, screen scraping 600 is straightforward. The process begins 602. The information displayed is simply applied as an input to the finite state machine, 604, which produces as a sequential output a series of return values representing the data to be extracted from the information displayed, 606. Once the information has been extracted, the process concludes, 608.

In an alternative application of aspects of embodiments, changes to the underlying data source and its interface can be detected. Assume that a data source has been queried, a response has been returned and a grammar has been induced and/or a parser generated according to the techniques described above. In such a case, if the data source is queried again, any differences between the previously induced grammar or the previously generated parser and a newly induced grammar or a newly generated parser indicate corresponding changes to the underlying data source and/or its interface. If the same query of the data source is expected to yield the same data, any differences between what was returned the first time and what was returned during a subsequent query are readily processed into differences in either induced grammar or generated parser. Even if there is no expectation that identical data will be contained in the result, grammar induction and parser generation will identify differences in the structures through which the data is represented.

Embodiments of aspects have application in numerous different contexts. Some aspects may be used to grab information posted to popular social network web sites such as Facebook and MySpace address lists. Other aspects may be used to extract a particular user's uploads, or uploads bearing particular tags, from user-content web sites such as Flickr or YouTube. A particular user's reviews can be extracted from various rating or review web sites. Both catalog web sites and price comparison web sites are susceptible to extraction of information using aspects of embodiments. Indeed, information can be extracted from any web site or other message source returning structured or semi-structured messages in response to queries.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method of extracting information from a data source, comprising:
    intercepting display information transmitted to a computer-implemented display device;
    wherein the display information is from the data source;
    wherein the display information includes information to cause particular visual content to be displayed on the computer-implemented display device;
    inducing a grammar via statistical analysis of the intercepted display information;
    wherein inducing a grammar includes determining how to break up the particular visual content into component parts;
    wherein determining how to break up the particular visual content into component parts includes:
        identifying a plurality of tokens in the particular visual content;
        for each token of the plurality of tokens, determining a frequency at which the token appears within the display information from the data source; and
        determining how to break up the particular visual content into component parts based, at least in part, on the frequency determined for each token of the plurality of tokens;
    generating a parser corresponding to the induced grammar; and
    performing screen scraping using the generated parser to produce a sequence of return values representing the extracted information;
    wherein the method is performed by one or more computing devices.

2. The method of claim 1, wherein inducing a grammar further comprises:
    forming a histogram of the tokens according to the frequency of each token; and
    segmenting the text into records starting with tokens with lower frequency.

3. The method of claim 1, wherein generating the parser further comprises:
    receiving the induced grammar;
    representing the induced grammar using a regular language; and
    programming state transitions of a finite state machine to correspond to relationships represented in the regular language.

4. The method of claim 3, wherein:
    the particular visual content includes fields; and
    the generated parser produces the sequence of return values based, at least in part, on annotations which specify which fields to extract from the particular visual content, and how the fields map to the return values.

5. The method of claim 3, wherein screen scraping further comprises:
    receiving the intercepted display information as an input to the finite state machine; and
    producing the return values representing the extracted information.

6. An apparatus for extracting information from a computer-based data source, comprising:
    means for intercepting display information transmitted to a computer-implemented display device representing information stored in a data source;
    wherein the display information includes information to cause particular visual content to be displayed on the computer-implemented display device; and
    a computer processor executing a sequence of instructions configuring the computer processor as:
        a grammar inducer producing a representation of a hierarchical structure that underlies the display information,
        wherein the hierarchical structure produced by the grammar inducer is described by a regular language;
        wherein the grammar inducer determines how to break up the particular visual content into component parts;
        wherein the grammar inducer determines how to break up the particular visual content into component parts by:
            identifying a plurality of tokens in the particular visual content;
            for each token of the plurality of tokens, determining a frequency at which the token appears within the display information from the data source; and
            determining how to break up the particular visual content into component parts based, at least in part, on the frequency determined for each token of the plurality of tokens;
        a parser-generator receiving the representation and configured to generate a parser corresponding thereto; and
        a screen scraper configured to extract the information from the intercepted display information using the generated parser.

7. The apparatus of claim 6, wherein the sequence of instructions for the grammar inducer further comprise instructions configuring the processor to perform:
    forming a histogram of tokens according to the frequency of each token; and
    segmenting the text into records starting with tokens with lower frequency.

8. The apparatus of claim 7, wherein the sequence of instructions for the grammar inducer further comprise instructions configuring the processor to perform:
    recursively segmenting the records to identify the underlying hierarchical structure.

9. The apparatus of claim 6, wherein: the particular visual content includes fields; and the sequence of instructions for the parser-generator further comprise instructions configuring the processor to perform: producing the sequence of return values based, at least in part, on annotations which specify fields to extract from the particular visual content, and how the fields map to the return values.

10. The method of claim 1 wherein the particular visual content includes text organized in an underlying hierarchical structure, and the method further comprises:
    identifying the underlying hierarchical structure by recursively segmenting the text into records, starting with tokens, of the plurality of tokens, that have lower frequencies.

11. A non-transitory computer-readable storage medium storing instructions for extracting information from a data source, wherein the instructions include instructions which, when executed by one or more processors, cause the one or more processors to perform a method comprising the steps of:

intercepting display information transmitted to a computer-implemented display device;

wherein the display information is from the data source;

wherein the display information includes information to cause particular visual content to be displayed on the computer-implemented display device;

inducing a grammar via statistical analysis of the intercepted display information;

wherein inducing a grammar includes determining how to break up the particular visual content into component parts;

wherein determining how to break up the particular visual content into component parts includes:

identifying a plurality of tokens in the particular visual content;

for each token of the plurality of tokens, determining a frequency at which the token appears within the display information from the data source; and determining how to break up the particular visual content into component parts based, at least in part, on the frequency determined for each token of the plurality of tokens;

generating a parser corresponding to the induced grammar; and performing screen scraping using the generated parser to produce a sequence of return values representing the extracted information.

12. The non-transitory computer-readable storage medium of claim 11, wherein inducing a grammar further comprises:

forming a histogram of the tokens according to the frequency of each token; and segmenting the text into records starting with tokens with lower frequency.

13. The non-transitory computer-readable storage medium of claim 11, wherein generating the parser further comprises:

receiving the induced grammar;

representing the induced grammar using a regular language; and programming state transitions of a finite state machine to correspond to relationships represented in the regular language.

14. The non-transitory computer-readable storage medium of claim 13, wherein:

the particular visual content includes fields; and the generated parser produces the sequence of return values based, at least in part, on annotations which specify which fields to extract from the particular visual content, and how the fields map to the return values.

15. The non-transitory computer-readable storage medium of claim 13, wherein screen scraping further comprises:

receiving the intercepted display information as an input to the finite state machine; and producing the return values representing the extracted information.

16. The non-transitory computer readable storage medium of claim 11, wherein the particular visual content includes text organized in an underlying hierarchical structure, and the method further comprises:

identifying the underlying hierarchical structure by recursively segmenting the text into records, starting with tokens, of the plurality of tokens, that have lower frequencies.

* * * * *